United States Patent Office 3,477,854
Patented Nov. 11, 1969

3,477,854
PREPARATION OF TEA EXTRACT FROM UNFERMENTED TEA
Luc Vuataz, Vevey, and André Giddey, La Tour-de-Peilz, Switzerland, assignors to Afico S.A., Lausanne, Switzerland, a Swiss company
No Drawing. Filed May 9, 1966, Ser. No. 548,427
Claims priority, application Switzerland, May 14, 1965, 6,736/65; Nov. 11, 1965, 15,582/65
Int. Cl. A23f 3/00
U.S. Cl. 99—77                                      10 Claims

ABSTRACT OF THE DISCLOSURE

Improved tea extracts prepared from fresh leaf by stripping aromatics before extraction or maturing a suspension of fresh leaf, optionally after fermentation.

---

The present invention is concerned with the production of vegetable extracts, particularly tea extracts.

Tea extracts, commonly known as "instant tea" or "soluble tea," are generally produced from black tea by processes analogous to the methods used in the home for the preparation of tea infusions. According to the literature, extracts may also be prepared from fresh tea leaves.

In the production of extracts from fresh leaf, the principal process steps are fermentation and extraction, and these are usually combined with a concentration and, in the case of powdered extracts, drying of the concentrated extract. The volatile aromatic substances present in tea, hereinafter simply called "aromatics," may be stripped from the extract and reincorporated at a later stage of the process. The conditions of fermentation have a considerable influence on the properties of the final product. Sometimes, the fresh leaf is comminuted before fermentation.

According to the invention, it has been found that the aroma, flavour and colour of tea extracts prepared from fresh leaf may be greatly improved by carrying out certain treatments on the leaf during the production of the extract.

In accordance with one embodiment of the invention, the fresh leaf is comminuted and at least a part of the aromatics is stripped before extraction. The aromatics thus recovered, optionally after rectification, are added to the extract. It should be noted that the stripping of aromatics takes place before extraction and, when black tea extracts are prepared, before the fresh leaf is fermented.

The expression "fresh leaf" as used herein is intended to mean not only freshly picked leaves of the tea tree, but also non-fermented leaves and leaves which have been withered or dried, provided that in all such leaves the natural enzymes are still present in active condition.

A further embodiment of the invention consists of the maturing of a suspension of fresh leaf for a predetermined period of time and under controlled conditions of temperature and pH.

In yet a further embodiment of the invention, a concentrated extract of tea, prepared by usual methods and optionally fermented, is matured for a certain time under suitable conditions of temperature and pH.

As indicated above, it has been found, in accordance with the present invention, that the aroma and flavour of a tea extract prepared from fresh leaves may be considerably improved by stripping aromatics from the fresh leaf before it is subjected to any treatment, such as fermentation and/or extraction. Preferably, the aromatics are stripped under reduced pressure, at temperatures below about 60° C. It is convenient to effect the stripping on a suspension of comminuted fresh leaf. The aromatics may be recovered, wholly or in part, for example at about 10° C.

The maturing to which reference is made essentially consists of maintaining for a certain period of time a suspension of comminuted leaf (or extract) under specific physical and chemical conditions.

Although it is preferred to use water for preparing the suspension of fresh leaf, it is also possible to employ suitable organic solvents (e.g. ethanol, acetone) as well as solvent/water mixtures. Alternatively, the suspending medium may be an extract prepared from partially-spent leaves, either fermented or not.

The specific conditions of time and temperature under which the maturing is effected depend on a certain number of factors principal among which are the concentration, pH and composition of the suspension and also the nature of the gaseous medium which is in contact therewith. In general, it is preferable to exclude oxygen so that an uncontrolled fermentation might be avoided.

Maturing of the suspension not only leads to an improvement of the aroma and flavour of the final product but also favour a more efficient fermentation (when black tea extracts are being prepared) during which an increased quantity of desirable theaflavins is formed, so that the colour is improved and the "green vegetable" aroma component is suppressed. These advantages may be assessed, for example, by spectroscopic examination in the case of colour and by vapour-phase chromatography for aromas. The results of taste-testing by qualified panels confirm that the aroma and flavour are improved.

Although it is preferable to apply the maturing treatment to freshly-plucked comminuted leaf, withered leaves may also be used.

According to one preferred embodiment of the invention, the leaves are comminuted in water, if desired with ice cooling. Alternatively, the leaves may be comminuted in frozen condition, without water. Preferably, the comminuting is effected at low temperatures, for example at about 10° C. or below. It is desirable to exclude oxygen from coming into contact with the leaves so that the risk of premature fermentation might be diminished. The leaves may also be comminuted in a solvent or solvent mixture, the later also optionally comprising water, or in an extract obtained by a second extraction of partially spent leaves.

For comminuting the leaves, any suitable piece of equipment may be used, such as a chopping machine of the tobacco-cutter or Legg-cutter type, or a hammer or ball mill or a mincer or mixer, it being desirable to obtain particles which are of a suitable size to give, on admixing with water, a slurry which will ferment homogeneously. By slurry as used herein is meant a dispersion of solids in a liquid which, upon being agitated, acquires the properties of a fluid and in particular is pumpable. Slurries having the desired properties may be obtained from leaves comminuted to an average particle size of about 0.5 to 2 mm. Of course, the slurry will contain a certain proportion of particles outside the stated range of size. The slurry should generally contain 1 to 10, preferably about 4, parts by weight of liquid for each part by weight of tea.

The conditions of maturing should be selected having regard to the properties desired for the final product. In general, it is the time and temperature which are the most important factors. For example, the maturing may be conducted within the limits defined by 24 hours at 0° C. and about 10 minutes at 60° C. Highly satisfactory results are obtained by maturing for 12 hours at 10° C. Alternatively, the temperature may vary, for example starting at 0° C. and increasing to 30° C. after 6 hours.

It should be understood that fermentation is an optional step in the process according to the invention, and the various advantages described above are also obtained when green tea extracts are prepared, when extraction of the leaf is carried out immediately after stripping of aromatics or maturing.

Fermentation of the suspension, when this is desired, may be carried out under varying conditions, which also depend on the characteristics sought in the extract. Essentially, fermentation consists of supplying oxygen to the suspension. This may be achieved, for example, by bubbling through the suspension, if desired under pressure, oxygen or air optionally enriched with oxygen. Mixtures of oxygen and an inert gas may also be used. Fermentation may also be induced by vigorously stirring the suspension in the presence of air. As the properties of the final product largely depend on the conditions of fermentation, the quantity of oxygen supplied should be carefully controlled. A short fermentation is preferred, and therefore it is desirable to disperse the oxygen homogeenously throughout the body of the suspension. It has been observed that too long a fermentation, caused for example by an insufficient supply of oxygen, tends to favour an increased and undesirable formation of thearubigins which make the extract excessively astringent.

The characteristics of the finished extract are also influenced by the temperature at which the fermentation is conducted. On the other hand, the temperature or temperature range chosen should be one at or in which the enzymes present in the fresh leaf are active, that is from about 20° to 60° C. Temperatures within the range 30 to 40° C. are particularly preferred.

Further factors which influence the fermentation are the manner in which the suspension has been treated (e.g., stripping of aromatics), the concentration and the pH. For example, the concentration of the suspension may be adjusted to the desired value (e.g., 4–5% solids) by the addition of an extract obtained from partially spent leaf.

If desired, the fermentation may be conducted at a pH which is lower than the natural pH of the suspension, for example as described in our co-pending application No. 47,491/63 now British Patent 1,034,670, corresponding to U.S. Patent 3,392,028. The pH of the suspension may also be adjusted to the desired value by treating with a cation exchange resin a quantity of extract prepared from partially-spent leaf and adding a suitable quantity of treated extract to the suspension. This extract may also be used for adjusting the concentration of the suspension before fermentation. It is also possible to strip aromatics during the fermentation.

When the desired degree of fermentation is reached, the fermentation may be arrested, for example by heating the suspension to inactivate the enzymes, for example to about 70–100° C. Fermentation may also be stopped by cutting off the supply of oxygen, or simply by discontinuing the agitation whereby the oxygen is dispersed in the suspension.

Heating of the suspension to inactivate the enzymes may also constitute the first step in the extraction of soluble substances from the tea. It may sometimes be desirable to collect aromatics during the extraction, for example by injecting steam and condensing the vapours which are liberated. The condensed aromatics may be fractionated, certain fractions being discarded if desired.

The extraction is carried out in conventional manner, for example by passing the suspension through heated tubes at 90 to 200° C. The specific temperatures to be employed will, of course, depend on the speed at which the suspension is passed and the type of extraction device used. Advantageously, the extraction is carried out as described in British patent specification No. 946,346, that is with simultaneous stripping of aromatics.

It has been observed that, under some conditions, heating of the suspension brings about a loss of some of the coloured substances formed during fermentation. Such losses may be substantially avoided, for example, by adding to the suspension a small quantity of unfermented extract before extraction. The amount of this unfermented extract to be added will depend on the intensity of fermentation and the colour desired for the final product.

When a suspension from which aromatics have been stripped is extracted, it may be advantageous to add a solvent such as acetone or ethanol. The yield of soluble substances may thus be substantially increased.

Upon completion of the extraction, the insoluble matter may be removed from the suspension, for example by filtration or centrifuging. There is generally no need to cool the suspension. The insoluble matter which is separated may be subjected to a second extraction and the extract thus obtained may be used for preparing the initial suspension and/or adjusting the pH and/or concentration of the suspension before fermentation.

The extract obtained after removal of insoluble matter may be concentrated to a paste or dried to a powder, for example by spray-, roller- or freeze-drying.

Any aromatics which have been collected at various stages of the process may, optionally after concentration and/or fractionation, be added to the extract before or after concentration or to the powdered product.

It is also possible to subject the extract to a cold-water solubilisation treatment, for example employing the different methods disclosed in U.S. patent specifications Nos. 2,831,772; 3,065,077 or 3,151,985.

The process according to the invention may also include the step of maturing the extract, thereby further enhancing its aroma and flavour. The maturing is effected when aromatics have been added to the extract after concentration, under conditions similar to those described for the maturing of the initial suspension, that is under controlled temperature, pH and time. Maturing at about 30° C. for 12 hours with agitation or vibration has given highly satisfactory results.

According to a further embodiment of the invention, a maturing or heat-treatment is effected on a suspension of fermented tea leaves before separation of the insoluble solids. It has been observed that such a heat-treatment leads to the formation of certain desirable aldehydes, and notably phenylacetaldehyde. These aldehydes, which are a constituent of black tea aroma, are formed by oxidation of the corresponding acids which are present in the fermented tea.

The maturing may also be effected after separation of insoluble matter, as has been indicated above. It is preferable to effect the maturing at a constant temperature, for example between 25 and 95° C. for a predetermined period of time, which is dependent on the temperature. Thus, a higher temperature will require a shorter maturing time and vice-versa. For example, the maturing may comprise maintaining the fermented suspension, or extract of fermented leaves, at a temperature of about 30° C. for 6 hours, or at about 90° C. for 30 minutes.

When the maturing is effected after extraction of soluble solids, it is sometimes preferable first to centrifuge at a low temperature (between 0 and 10° C.) and subsequently to concentrate the extract, for example to a concentration of about 20% soluble solids. Thereafter the solids removed by centrifuging are added and the concentrated extract is matured. This procedure is particularly advantageous in the preparation of cold-water soluble extracts, for the separated solids may be solubilized, for example by the method described in U.S. Patent No. 3,151,985.

The following examples are given by way of illustration only. The theaflavin and thearubigin values of the extracts given in the Examples 2 to 5 were determined by the method set out in Example 1.

EXAMPLE 1

Estimation of theaflavins and thearubigins

(I) THEAFLAVINS

The pH of 100 mls. of an aqueous solution containing 0.5 to 1.0 g. soluble tea solids is adjusted to 5.0 and the solution shaken twice for 5 minutes with 200 mls. of an 8:2 (v./v.) ethyl acetate/petroleum ether mixture.

The organic solutions 1 and 2 are each made up to 200 mls. The dissolved solvents are removed from the aqueous solution under vacuum and the solution made up to 100 mls. (solution 3).

One then proceeds as follows:

(a) 2 mls. of solution 1 are mixed with 2 mls. of reagent (2% w./w. solution of Flavognost (Heyl & Co., Berlin) in ethanol) and 2 mls. ethanol are added. After shaking and standing for 15 minutes at room temperature, the extinction coefficient is measured at 600 m$\mu$=$x_1$, using 2 mls. of solution 1+4 mls. ethanol as blank. The same procedure is repeated with solution 2, giving $E_{600}$ m$\mu$=$x_2$. Then $$100\ (x_1+x_2)=VTF_{600}$$

(VTF=theaflavin value).

To obtain VTF, one multiplies $VTF_{600}$ by 6.6. (The factor 6.6 was established experimentally, by analysing pure theaflavins.)

(b) 2 mls. of solution 1 are mixed with 8 mls. of 8:2 (v./v.) ethyl acetate/petroleum ether mixture and $E_{455}$ m$\mu$ (=$y_1$) measured against water.

$E_{455}$ m$\mu$ of solution 2 (=$y_2$) is then determined without dilution. Then $VTF'=200\ (5y_1+y_2)$.

VTF' is greater than VTF because of the small quantity of thearubigins which was extracted by the solvent mixture. For pure theaflavins, $VTF'=VTF$.

(II) THEARUBIGINS 2 mls. of solution 3 obtained as described above are mixed with 10 mls. of water and made up to 100 mls. with ethanol. $E_{455}$ m$\mu$ is then measured (=$z$). Then $5000\ z=VTR'$ (thearubigin value).

$$VTR=VTR'+VTF'-VTF$$

Total value (VT) of theaflavins and thearubigins is obtained by adding VTF and VTR. VTF is then calculated as a percentage of VT.

The following is a typical set of values obtained by the method described above for an infusion prepared from 2 g. Ceylon tea in 100 mls. water. The values may be calculated either for 100 mls. of infusion (a) or for 1 g. of soluble dry solids (b).

|     | VTF | VTR | VT  | VTF/VT Percent |
|-----|-----|-----|-----|----------------|
| (a) | 45  | 225 | 270 | 16.7           |
| (b) | 75  | 375 | 450 |                |

EXAMPLE 2

Fresh Ceylon tea leaf is comminuted at 4° C. with a machine having a cutting action. The machine is set to produce particles about 1 mm. in size. Water at 4° C. is added to the particles to give a suspension containing 4.2% by weight of total solids.

The suspension is transferred to a rotary Craig evaporator and distilled for 45 minutes, water being continuousy added to maintain the solids concentration at 4.2%. The pressure is regulated to maintain a temperature of 30° C. The vapours which are not condensed by the evaporator condenser are collected in a trap maintained at −80° C. and subsequently added to the distillate. After rectification at 55° C., 0.5 ml. of aromatics is obtained for each gram of solids extracted.

The stripped suspension is then transferred to a tank where it is maintained with vigorous stirring for 30 minutes at 38° C., a quantity of air equal to 1½ times the volume of the suspension being bubbled in.

Upon completion of the reaction period, the supply of air is cut off and stirring discontinued. The temperature is quickly raised to 95° C. and the liquid extract separated from the insolubles by filtration or centrifuging. The liquid extract obtained is designated $E_1$; the insolubles are mixed with 2 parts of water at 95° C. and stirred for 3 minutes. A second extract, designated $E_2$, is obtained by removing the insoluble matter by filtration or centrifuging. The two extracts are combined, concentrated, the aromatics previously collected are added and the mixture freeze-dried.

The procedure described above was repeated three times, the suspension in each case being matured under the following conditions, before stripping of aromatics:

| Degrees, C. | Hours |
|-------------|-------|
| 4           | 15    |
| 20          | 15    |
| 37          | 4.5   |

The finished extracts were then analysed by the method described in Example 1, giving the following results:

| Conditions of maturing | Per g. of powder | | | VTF/VT Percent |
|---|---|---|---|---|
| | VTF | VTR | VT | |
| (1) No maturing | 180 | 355 | 535 | 33.8 |
| (2) 15 hours at 4° C | 230 | 370 | 600 | 38.4 |
| (3) 15 hours at 20° C | 250 | 330 | 580 | 43.1 |
| (4) 4.5 hours at 37° C | 305 | 290 | 595 | 51.5 |

The results of taste-testing by a qualified panel indicate that the properties of the four extracts approach more and more closely those of a black tea infusion in the order 1 to 4. These results are confirmed by vapour phase chromatography.

EXAMPLE 3

A suspension of fresh tea is prepared as described in Example 2, except that deionised water is used and the total solids concentration is raised to 5%. South India tea is employed. The suspension is stirred so that the temperature rises from 4 to 30° C in 8 hours and aromatics are then stripped in a climbing film evaporator. The pressure is adjusted to maintain the temperature of the suspension at 50° C. The quantity of distilate corresponds to 75% of the weight of the leaves, and the total solids concentration rises to 6.2%. The vapours are condensed at 4° C. and rectified at atmospheric pressure. 0.4 ml. or aromatic distillate per gram of extracted solids is obtained.

The suspension is diluted by adding an extract $E_2$, obtained from partially spent leaves, to a total solids concentration of 3.8%. The mixture is vigorously stirred for 30 minutes at 40° C. whilst bubbling in a quantity of oxygen corresponding to 1½ times the volume of the suspension.

At the end of the reaction, bubbling and stirring are stopped and extraction effected as described in Example 2. However, the extract $E_2$, instead of being combined with $E_1$, is cooled and added to the suspension as described above.

This sequence of operations is repeated a number of times. The extract $E_1$ is concentrated under reduced pressure, the aromatics previously collected are added and finally the extract is dried on a roller drier.

In one modification, extract $E_2$ is decationised with a strong cation exchange resin in hydrogen form. Addition of non-decationised $E_2$ to the suspension lowers the pH during fermentation from 5.7 to 5.2; addition of decationised $E_2$ reduces the pH from 5.0 to 4.9.

ANALYSES

| | Per g. of dry solids | | | VTF/VT as percent |
|---|---|---|---|---|
| | VTF | VTR | VT | |
| $E_1$ not decationised | 145 | 310 | 455 | 32.0 |
| $E_2$ decationised | 195 | 235 | 430 | 45.5 |

EXAMPLE 4

An aqueous suspension of Ceylon tea, containing 5% total solids, is stripped as described in Example 3 expect that steam at 50° C. is injected into the evaporator to maintain the total solids concentration at a constant level.

Thereafter, the suspension is cooled to 30° C. and passed to a reactor where it is vigorously agitated whilst in contact with pure oxygen. When the reactor is half filled, the fermented suspension is removed.

The temperature is adjusted at 30° C. and the inward and outward rates of flow of suspension in the reactor are set to give an average residence time of 20 minutes. The outward flow is regulated to maintain the suspension at a constant level. The extract removed from the reactor is passed to a climbing film evaporator where it is heated to 95° C. with simultaneous stripping of aromatics.

After centrifuging, extract $E_1$ is obtained. The partially spent leaf is extracted again to give extract $E_2$ which is added to $E_1$. The aromatics are rectified to give 0.2 ml. per gram of extracted solids and are incorporated in the combined extracts at reduced pressure to give a 35% total solids concentration. The concentrated extract is then spray-dried.

In one modification, the concentrated extract is maintained in a closed vessel, with vibration, for 12 hours at 30° C.

In a second modification, the fermentation is effected at 45° C. and the extract divided into 2 portions. The first is spray-dried immediately, whereas the second is matured as in the first modification.

ANALYSES

|  | Per gram of powder | | | VTF/FT as percent |
|---|---|---|---|---|
|  | VTF | VTR | VT |  |
| Fermentation at 30° C.: | | | | |
| (1) Extract dried immediately | 230 | 270 | 500 | 46.0 |
| (2) Extract matured for 12 hours at 30° C | 220 | 300 | 520 | 42.2 |
| Fermentation at 45° C.: | | | | |
| (3) Extract dried immediately | 130 | 325 | 455 | 28.7 |
| (4) Extract matured for 12 hours at 30° C | 125 | 340 | 465 | 26.8 |

The results of taste-testing indicate that powders 1 and 2 are preferred to 3 and 4. On the other hand, powders 2 and 4 resemble a black tea infusion more closely than 1 and 3. These results are confirmed by vapour phase chromatography.

EXAMPLE 5

Extracts are prepared as described generally in Example 3. Stripping of aromatics is effected at 60° C. and the fermentation carried out for 30 minutes with air at a pressure of 4.5 atmospheres (Extract 1).

In a second variant (Extract 2), fermentation time is reduced to 10 minutes and oxygen at 4.5 atmospheres is used.

ANALYSES

|  | Per gram of powder | | | VTF/VT as percent |
|---|---|---|---|---|
|  | VTF | VTR | VT |  |
| Extract 1 | 185 | 285 | 470 | 39.4 |
| Extract 2 | 240 | 365 | 605 | 39.7 |

EXAMPLE 6

A suspension of fresh tea is prepared as described in Example 2, except that a part of the decationised water is replaced by extract $E_2$ prepared from partially spent leaves The suspension, containing 4.5% total solids, is matured for 15 hours at 4° C.

Aromatics are then stripped as described in Example 4 and fermentation is effected at 30° C. for 30 minutes with addition of a quantity of air corresponding to 1½ times the volume of the suspension, which is stirred vigorously throughout. Fermentation is stopped by cutting off the air supply and discontinuing stirring.

A quantity of unfermented extract, corresponding to 80% of the weight of the suspension, is then added. The unfermented extract is prepared from the same quantity of fresh leaf as that which is fermented. Extraction is carried out under the conditions specified in Example 4, except that extract $E_2$ is used for preparing the initial suspension of fresh leaf. Extract $E_1$ is concentrated in vacuo so that after addition of rectified aromatics the total solids content is 35%. The concentrated extract is freeze-dried.

The unfermented extract is obtained by preparing a suspension of fresh leaf as described in Example 2 except that a part of the water is replaced by extract $E_2$. The suspension, containing 4.5% of total solids, is matured for 15 hours at 4° C.

The extraction is carried out as described in Example 4, with simultaneous stripping of aromatics, except that extract $E_2$ is used for preparing the initial suspension and extract $E_1$ is not centrifuged to clarity. The aromatics which are collected are added to the suspension which is to be fermented, the mixture being rectified to obtain 0.5 ml. per gram of extracted solids.

A second extract is obtained by the same procedure except that unfermented solids are not added before extraction.

EXAMPLE 7

The procedure described in Example 2 is repeated as far as the end of the fermentation stage (air cut off and stirring stopped). The fermented suspension is then cooled to 30° C. and maintained at this temperature for 6 hours in a closed vessel.

Thereafter, the suspension is passed to a climbing-film evaporator where it is heated to 95° C. with simultaneous stripping of aromas. After centrifuging to remove the insoluble solids the first extract, designated $E_1$, is obtained. The insoluble solids are extracted for a second time to yield extract $E_2$ which is added to extract $E_1$. The stripped aromas are rectified to yield 0.2 ml. of aromatics per gram of extracted solids. Meanwhile the combined extracts are concentrated to 35% soluble solids and the aromatics are then added. Finally, the extract is spray-dried.

In a modification of the process, the steps of maturing and stripping before fermentation are omitted.

The two extracts thus obtained resemble more closely a freshly brewed tea infusion than do extracts prepared by a similar process but without maturing after fermentation.

EXAMPLE 8

Fresh Ceylon tea is comminuted and fermented as described in the preceding example.

After fermentation, the insoluble matter is removed and extracted a second time. The two extracts are mixed, concentrated to 3% soluble solids and the mixture is centrifuged at 6° C.

The liquid is then concentrated to 20% solids and heated in a closed vessel for 30 minutes at 90° C. The solid material removed by centrifuging is then added, the mixture stirred until dissolution of the solids and the stripped aromatics are added. The extract is finally roller-dried under reduced pressure.

By way of comparison, the process was repeated without the heating of the centrifuged extract. Vapour-phase chromatography indicates the presence in the first extract of greater quantities of the aldehydes, notably phenylacetaldehyde, found in black tea aroma than in the second extract.

We claim:
1. In a process of preparing tea extracts from fresh tea which includes the operations of comminuting unfermented fresh tea, extracting tea solubles and separating the extracted tea solubles from insoluble material, the improvement which comprises at least one of the following steps:
  (i) stripping aromatics under reduced pressure at a temperature not exceeding about 60° C. from a suspension of fresh unfermented tea and enzymatically fermenting the stripped suspension at a temperature of 20°–60° C. by supplying oxygen thereto prior to extracting solubles from the fermented suspension;
  (ii) maturing a suspension of comminuted, unfermented tea containing about 1–10 parts of liquid per part of tea at a temperature of about 0°–60° C. and a time of about 24 hours to about 10 minutes prior to the operation of extracting tea solubles;
  (iii) prior to the operation of extracting tea solubles by hot water, enzymatically fermenting a suspension of fresh tea containing about 1–10 parts of liquid per part of tea at a temperature of about 20°–60° C. by supplying oxygen thereto, and maturing a suspension of fermented tea at a temperature of about 25°–95° C. and a time of about 6 hours to about 30 minutes; and
  (iv) after the operation of extracting tea solubles, concentrating the extract, adding aromatics stripped from fresh, unfermented tea and maturing the concentrated extract at a temperature of about 25°–95° C. and a time of about 6 hours to about 30 minutes.

2. A process according to claim 1 in which, in step (i), the tea is in suspension in water or aqueous ethanol.

3. A process according to claim 1 in which, in step (i), the stripping of aromatics is effected under reduced pressure at about 60° C. and the aromatics are condensed at about 10° C.

4. A process of preparing a tea extract from unfermented fresh tea which comprises the steps of
  (a) comminuting the fresh tea in a liquid selected from the group consisting of water, water-miscible organic solvent, aqueous organic solvent and extracts of partially spent tea leaves to provide a suspension of fresh tea containing about 1–10 parts of liquid per part of tea;
  (b) stripping and recovering volatile aromatics from said suspension, said stripping being effected under reduced pressure at a temperature not exceeding 60° C.;
  (c) enzymatically fermenting said suspension by supplying oxygen thereto, the fermentation being effected at a temperature of 20 to 60° C.;
  (d) extracting the soluble matter from the fermented tea by heating the suspension to a temperature of 90 to 200° C.;
  (e) separating the insoluble matter from the fermented tea suspension;
  (f) incorporating stripped aromatics in the extract before or after separating insoluble matter from the fermented suspension; and
  (g) recovering a liquid tea extract.

5. A process according to claim 4 in which the liquid is an extract obtained by extracting partially spent tea leaf.

6. A process according to claim 4 in which the liquid is water.

7. A process according to claim 4 in which a quantity of unfermented tea solids is added to the fermented suspension before extraction.

8. A process according to claim 4 in which before extraction, the suspension is matured for 12 hours at 10° C.

9. A process according to claim 4 in which aromatics are stripped from the suspension during fermenting.

10. A process according to claim 4 in which the extract is dried to a powder.

References Cited
UNITED STATES PATENTS

| | | | |
|---|---|---|---|
| 2,476,072 | 7/1949 | Tressler | 99—77 |
| 2,863,775 | 12/1958 | Perech | 99—77 |

OTHER REFERENCES

Chemical Abstracts, vol. 17, 1923, pp. 2156–2157.

MAURICE W. GREENSTEIN, Primary Examiner

U.S. Cl. X.R.

99—76

PO-1050
(5/69)

UNITED STATES PATENT OFFICE
CERTIFICATE OF CORRECTION

Patent No. 3,477,854     Dated November 11, 1969

Inventor(s) Luc Vuataz and André Giddey

It is certified that error appears in the above-identified patent and that said Letters Patent are hereby corrected as shown below:

Column 2, line 22, "favour" should read --favours--.
Column 3, line 21, "homogeenously" should read --homogeneously
Column 5, line 15, "w./w." should read --w./v.--.
Column 6, line 43, "distilate" should read --distillate--.
Column 7, under first "ANALYSES", "VTF/FT" should read
                --VTF/VT--;
Column 7, line 3, "expect" should read --except--;
Column 7, line 66, after "leaves" insert --.--.
Column 9, line 32, after "minutes" insert --.--;
Column 9, line 33, after "(i)", delete "." and insert --,--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents